Figure 1:
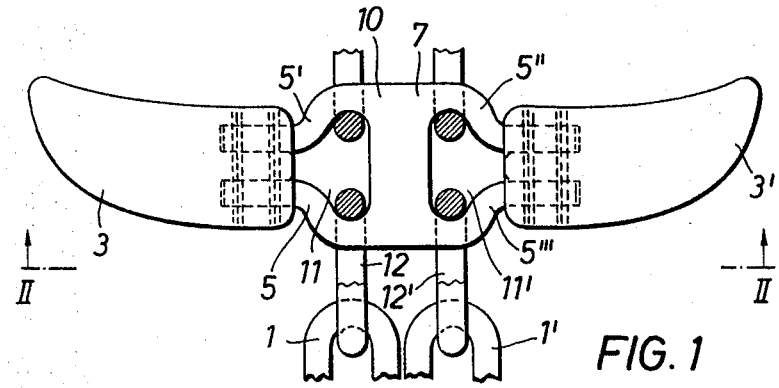

United States Patent [11] 3,587,831

| [72] | Inventor | Helmut Temme<br>Waltrop, Germany |
|---|---|---|
| [21] | Appl. No. | 782,289 |
| [22] | Filed | Dec. 9, 1968 |
| [45] | Patented | June 28, 1971 |
| [73] | Assignee | Gewerkschaft Eisenhutte Westfalia<br>Wethmar bei Lunen/Westfailia, Germany |
| [32] | Priority | Dec. 20, 1967, June 10, 1968 |
| [33] | | Germany |
| [31] | | P 15 83 139.7 and P 17 58 481.5 |

[54] SCRAPER-FLIGHT CONVEYOR
8 Claims, 10 Drawing Figs.

[52] U.S. Cl............................................... 198/171,
198/176
[51] Int. Cl....................................... B65g 19/00
[50] Field of Search........................................ 198/175,
176, 168, 171

[56] References Cited
UNITED STATES PATENTS

| 435,025 | 8/1890 | Schenck | 198/176 |
| 1,182,458 | 5/1916 | Coleman | 198/176 |
| 2,555,338 | 6/1951 | Hapman | 198/175 |

*Primary Examiner* — Richard E. Aegerter
*Attorney* — Burgess, Dinklage and Sprung ABSTRACT: In a scraper-flight conveyor having scraper arms mounted on chain disposed longitudinally of the conveyor for working movement of the scraper arms by longitudinally moving the chain, the improvement which comprises two chains disposed adjacent the longitudinal centerline of the conveyor, each comprising short chain sections couplers each joining together adjacent ends of adjacent sections of each of the chains and the two chains the scraper arms being mounted on the couplers.

INVENTOR:
HELMUT TEMME

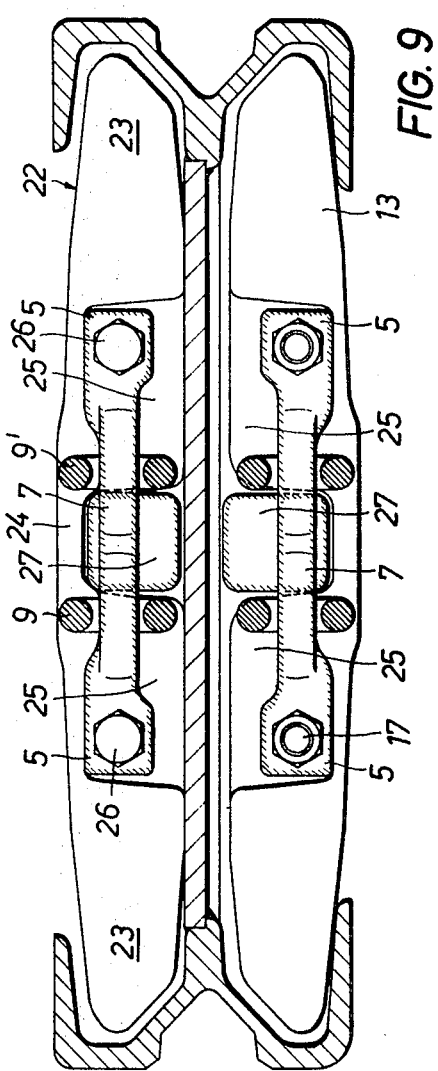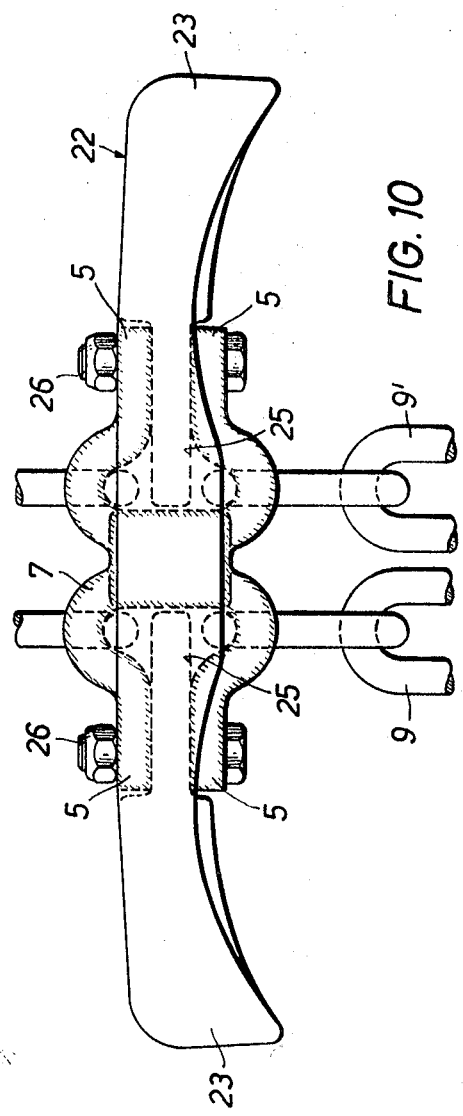

SCRAPER-FLIGHT CONVEYOR

BACKGROUND OF THE INVENTION

The invention relates to a chain for scraper-flight conveyors, which has two round-link chains composed of short sections with the flights attached to the junctions between the sections.

Single-strand flight conveyors have the known advantage over flight conveyors of the prior art equipped with two or more round-link chains that they can negotiate curves with a short radius. In the single-strand flight conveyors or the prior art, there exists the difficulty of making the chains of such a size that they can sufficiently withstand high tensile stresses, and this is of the utmost importance in the case of conveyors of great length. There is a limit, however, to the practical size of round chain links, which is reached when the breadth of the vertically disposed links becomes excessive. The conveyor trough must also be made deeper accordingly. The breadth of the vertical chain links has to be smaller than the distance from the bottom of the trough to the top edge of the side flange of the trough. Links having a greater breadth would extend too far down in the return section beneath the trough, so that, for example, when such a conveyor is used in mining operations, the chain would cut a groove in the floor, thereby wasting power and increasing wear and tear on the chain. Furthermore, the vertically disposed chain links engaging in the groove in the floor will interfere with the lateral displacement of the conveyor, whereas in modern mining operations the entire conveyor has to be advanced laterally as the winning progresses.

The invention is directed to the problem of designing the chain of a scraper-flight conveyor in such a manner that the height of the trough will be minimal in order to facilitate loading the trough from the side and to keep the weight of the conveyor from being excessive. Furthermore, the ability of a single-strand conveyor to negotiate curves is to be combined with the known advantages of a double-strand conveyor which is distinguished by the high load carrying capacity of the circulating chain. Furthermore, a solution is to be provided for the difficulty that exists in single-strand conveyors using round-link chains, with regard to fastening the flights to the chain so as to resist the twisting and displacement of the flights. Lastly, the chain is to be so constructed as to permit the use of sprockets having teeth which engage the openings in the links.

THE INVENTION

The invention provides improvement in the scraper-flight conveyors having scraper arms mounted on chain disposed longitudinally of the conveyor for working movement of the scraper arms by longitudinally moving the chain. According to the invention, two chains are disposed adjacent to the longitudinal center line of the conveyor, each being made up of short chain sections. Couplers are provided which each join together adjacent ends of adjacent sections of each of the chains, and also the two chains, and scraper arms are mounted on the couplers. The laterally outwardly disposed ends of the couplers can be bifurcated to facilitate mounting of the scraper arms thereon.

Figure 3:
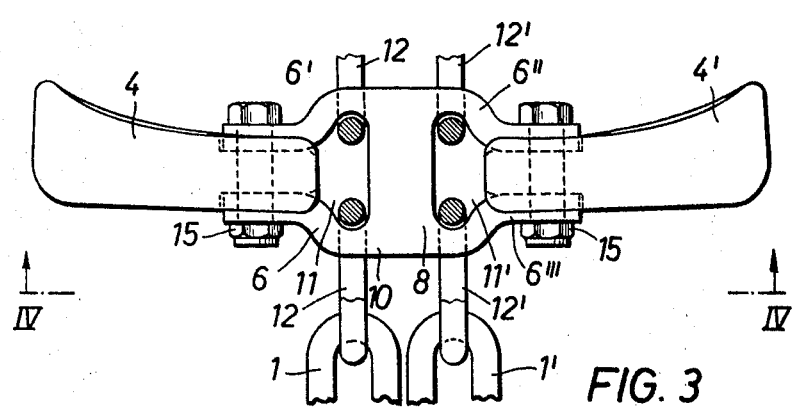
Figure 4:
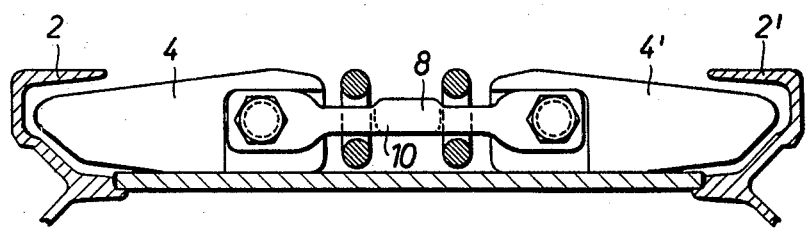
Figure 5:
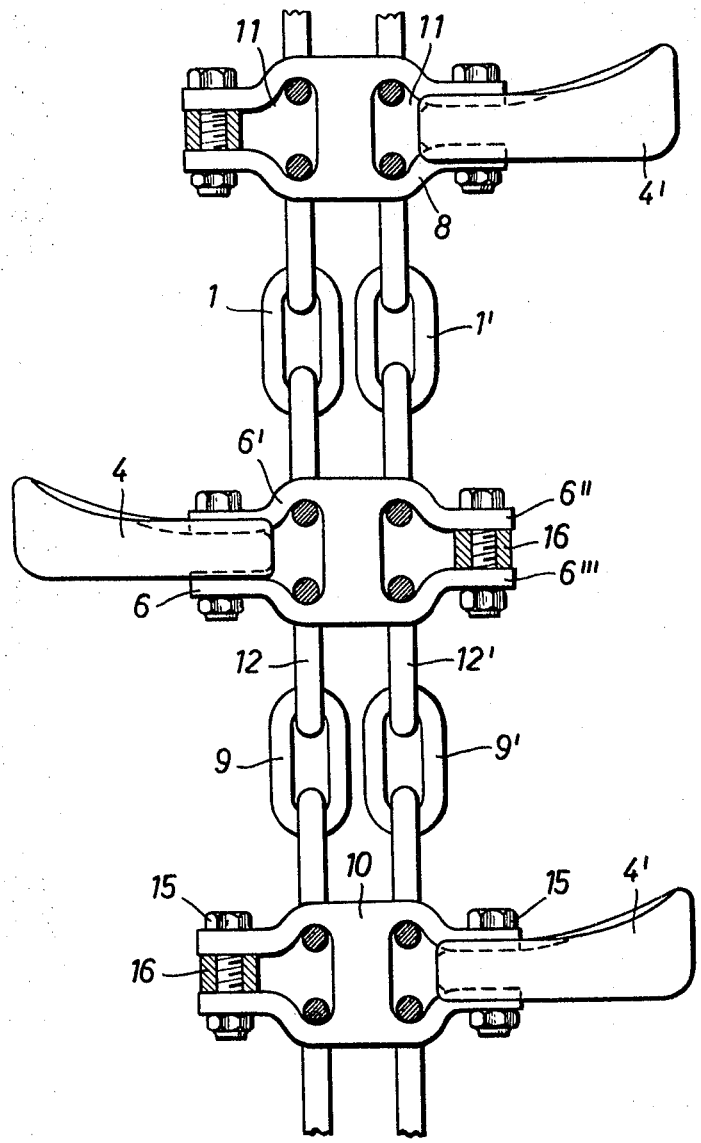

The invention solves the various problems mentioned in that, in a scraper-flight chain having two link strands each composed of short sections and disposed alongside one another near the longitudinal center of the conveyor, each chain coupling joins together two pairs of sections of the two chain strands and at the same time joins together the two strands, the extremities of the couplings facing the trough sides can be bifurcated and provided with fastening members of the attachment of the scraper arms. It is advantageous to provide separate scraper arms for the right side and for the left side of the conveyor (FIGS. 1—4). If desired, however, a flight can be disposed on one side only, in which case a spacer can be inserted into the bifurcated extremity on the other side of the coupling (FIG. 5).

Figure 7:
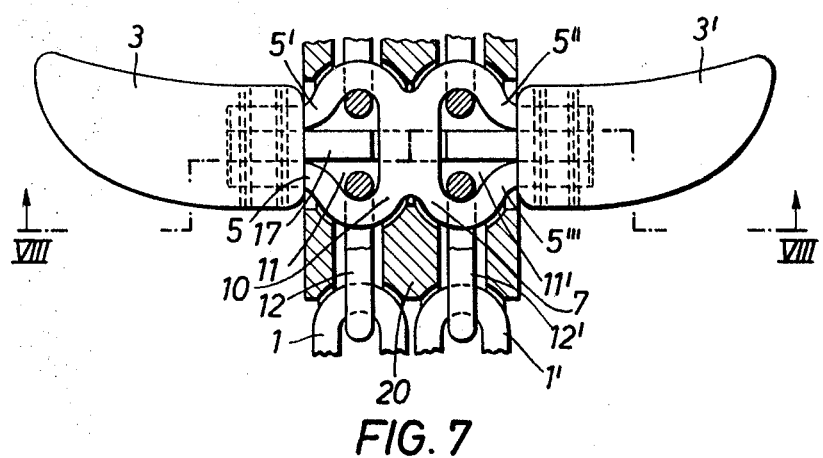
Figure 8:
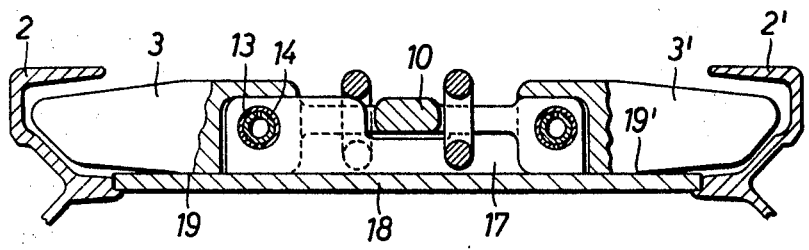

Otherwise, the flights can be of many different designs. It is particularly desirable to fabricate the flights in such a manner that they externally envelope the bifurcated extremities of the coupling (FIGS. 7 and 8). A bridging member can then be inserted from below between the extremities of the coupling, the said bridging member extending downward as far as the floor of the conveyor. The result is scraper arms which are composed of a plurality of parts, but which cover the entire width of the conveyor from one side to the other of the trough.

The additional bridging member can be joined to the extremities of the coupling by the same fastening means which secure the scraper arms in their working position.

Another advantageous method of arranging the scraper arms consists in joining the right and left arms together by means of a bridge spanning the chain coupling (FIGS. 9, 10). This bridge can then bear vertical webs extending downward to engagement with the surface at the trough, and the coupler can be bolted to the web. In the assembly of the system, these scrapers are moved downward to position them on the coupler. The inwardly disposed portion of the coupler can have a projection reaching to the floor of the conveyor. The vertical web and the said projection of the chain coupler can cover the entire breadth of the trough between the scraper arms.

EXAMPLES

Figure 2:
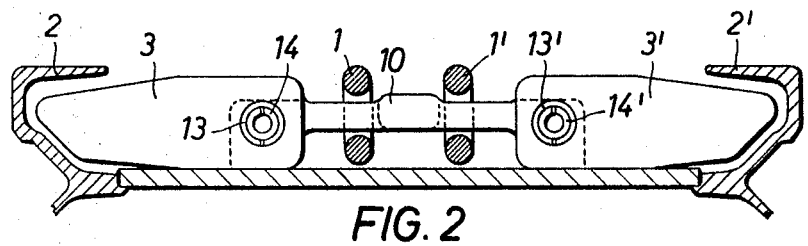
Figure 6:
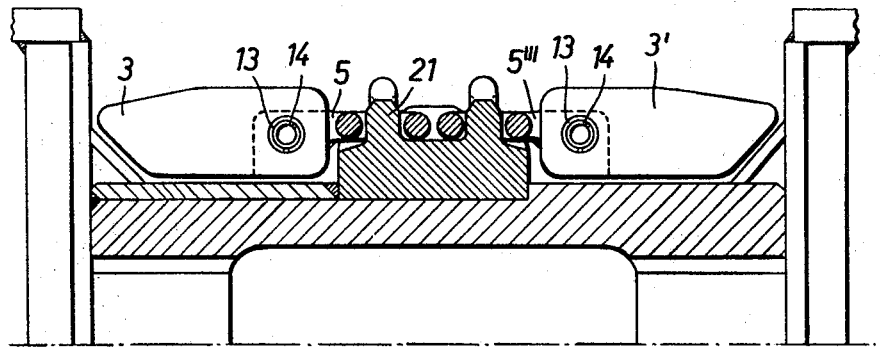

A number of examples of the invention are represented in the drawing, in which:

FIG. 1 is a top view of a portion of scraper-flight conveyor;
FIG. 2 is a cross section on line II–II of FIG. 1;
FIG. 3 is a top view of another embodiment;
FIG. 4 is a cross section on line IV–IV of FIG. 3;
FIG. 5 is another embodiment;
FIG. 6 shows the chain passing over a sprocket which engages the chain internally;
FIG. 7 shows the scraper-flight chain passing over a sprocket engaging the chain externally, in the top view;
FIG. 8 is a section on line VIII–VIII of FIG. 7; and
FIG. 9 is another embodiment in a vertical cross section; and
FIG. 10 is a top view of a portion of the scraper-flight chain shown in FIG. 9.

The round-link chains 1 and 1' are disposed on the immediate right and left sides of the longitudinal center line of the conveyor, and they comprise the individual chain sections 9 and 9' (FIG. 5). The end links 12 and 12' of the chain sections 9 and 9' engage in openings 11 and 11' in the chain couplings 7 (FIGS. 1,2) and 8 (FIGS. 3,4). The chain couplings 7 and 8 are provided at their extremities facing the side members 2 and 2' of the conveyor with portions 5, 5', 5'', 5''' and 6, 6', 6'', 6''', respectively. In its central portion the chain coupling has a web 10 which determines the distance between the adjacent chain strands. The chain coupling portions 5 to 5''' and 6 to 6''' serve for the mounting of scraper-flights 3, 3' and 4, 4', respectively. This mounting is performed by means of drive pins 13 and 14 or bolts 15. REferring to FIG. 5, when the scraper arms 4 are disposed with adjacent scraper arms on alternate sides of the chain, one of the two pairs of portions 6 to 6''' associated with each coupling 8 bears a scraper-arm 4 while the other pair is spaced apart by a bushing 16.

Referring to FIG. 6, the sprocket 21 can engage the openings 11 and 11' (FIGS. 1 and 3). Thus the sprocket engages the chain internally.

If vertical bridging members 17 (FIGS. 7,8) are provided, which fit beneath and through the one-piece chain couplers, an externally engaging sprocket 20 is used (FIG. 7). The bridge members 17 increase the entraining surface of the scraper arms 3 and 3', the surface 18 of bridge members 17, which faces the floor of the conveyor, being flush with the corresponding surfaces 19 and 19' of the scraper-flights.

In the embodiment in FIGS. 9 and 10 of the drawing, the short individual sections of the two chain strands 9 and 9' are joined together in turn by a chain coupling 7 which has bifurcated extremities 5 on each side for the mounting of a scraper 22, which is constructed in one piece in this case. In this embodiment, the two scraper arms 23 are joined together by a connecting member 24 which spans the chain coupling 7. To this bridge 24 there are also joined the webs 25 (which can be integral with the scraper 23) by means of which the scraper arms 23 engage between the legs 5 of the chain coupling 7. The bolts 26 close the chain coupling 7 at both ends and at the same time secure the flight 23 in its working position. The chain coupling 7 furthermore has in its center a projection 27 directed downward against the floor of the conveyor and extending as far as the bottom edge of the scraper-flights.

I claim:

1. In a scraper-flight conveyor having scraper arms mounted on chain disposed longitudinally of the conveyor for working movement of the scraper arms by longitudinally moving the chain, the improvement which comprises:

two round-link chains disposed adjacent the longitudinal center line of the conveyor, each comprising short chain sections;

couplers each joining together adjacent ends of adjacent sections of each of the chains and the two chains;

the scraper arms being mounted on the couplers;

the laterally outwardly disposed ends of the couplers being bifurcated, the scraper arms being mounted on the bifurcated ends.

2. Conveyor according to claim 1, a separate scraper arm being mounted on each laterally outwardly disposed end of each coupler.

3. Conveyor according to claim 1, the scraper arms on each coupler being integrally joined together by a connecting member disposed on the side of the chains opposite the conveyor floor, and webs extending downwardly from the connecting member to between the bifurcated ends of the coupler.

4. Conveyor according to claim 3, each coupler having a centrally disposed projection extending downwardly toward the floor of the conveyor to the level of the bottom edge of the scraper arm.

5. Conveyor according to claim 3, the bifurcated ends of each coupler being joined by a web which determines the distance separating the two chains, said bifurcated ends forming openings, the chain sections being connected to the coupler by engagement of the chain links in said openings.

6. In a scraper-flight conveyor having scraper arms mounted on chain disposed longitudinally of the conveyor for working movement of the scraper arms by longitudinally moving the chain, the improvement which comprises:

two chains disposed adjacent the longitudinal center line of the conveyor, each comprising short chain sections;

couplers each joining together adjacent ends of adjacent sections of each of the chains and the two chains;

the scraper arms being mounted on the couplers;

a separate scraper arm being mounted on each laterally outwardly disposed end of each coupler, and a bridging member for the scraper arms mounted on each coupler, the bridging member extending from one scraper arm to the other scraper arm and downwardly for sliding contact with the conveyor floor.

7. Conveyor according to claim 6, the scraper arms externally enveloping the ends of the coupler on which the arms are mounted.

8. Conveyor according to claim 6, and fastening means securing both the scraper arms and the bridging member to the coupler.